United States Patent [19]
Smith

[11] 4,094,774
[45] June 13, 1978

[54] METHOD AND APPARATUS FOR OXYGENATING AEROBICALLY DECOMPOSABLE LIQUORS

[76] Inventor: Eugene J. Smith, Storms Rd., Valley Cottage, N.Y. 10989

[21] Appl. No.: 556,918

[22] Filed: Mar. 10, 1975

Related U.S. Application Data

[63] Continuation-in-part of Ser. No. 476,856, Jun. 6, 1974, abandoned, and a continuation-in-part of Ser. No. 530,037, Dec. 5, 1974, abandoned.

[51] Int. Cl.$^2$ .......................... C02B 1/34; C02C 1/02
[52] U.S. Cl. ........................................ 210/12; 210/14; 210/63 R; 210/71; 210/178; 210/181; 210/187; 210/195 R; 210/220
[58] Field of Search ....................... 210/12, 71, 72, 63, 210/181, 187, 195, 198, 207, 208, 14, 177, 178, 205, 220, 221 M

[56] References Cited

U.S. PATENT DOCUMENTS

| | | | |
|---|---|---|---|
| 2,559,462 | 7/1951 | Pirnie | 210/63 X |
| 2,638,444 | 5/1953 | Kappe | 210/12 X |
| 3,359,200 | 12/1967 | Gitchel et al. | 210/63 |
| 3,547,815 | 12/1970 | McWhirter | 210/195 S |
| 3,623,977 | 11/1971 | Reid | 210/178 X |
| 3,737,382 | 6/1973 | Fletcher et al. | 210/71 X |
| 3,755,142 | 8/1973 | Whipple, Jr. | 210/63 R |
| 3,817,048 | 6/1974 | Burley | 210/71 X |
| 3,835,048 | 8/1974 | Walter | 210/63 R |

OTHER PUBLICATIONS

Carter Bulletin D661 - Walking Beam Flocculation, 1966, Ralph Carter Co., Hackensack, N.J.

*Primary Examiner*—John Adee
*Attorney, Agent, or Firm*—Brooks, Haidt, Haffner & Delahunty

[57] ABSTRACT

Aerobically decomposable liquors are oxygenated by continuously extracting a portion thereof from an aeration tank and saturating the liquor portion with oxygen within a separate receiver tank, thereafter returning the oxygenated liquor portion to the aeration tank. The continuously flowing liquor portion is cooled prior to its oxygenation so that its oxygen-absorbing capability is increased. Cooling is effected by extracting therefrom the heat required to gasify the initially liquified gas being introduced into the receiver tank as the oxygenating medium. Secondary cooling of the liquor portion before its oxygenation can be effected by extracting therefrom an additional amount of heat as required to gasify a second liquified gas, such as nitrogen. Such heat exchange may be conducted in a separate heat exchanger, but is preferably conducted via parallel and adjacent heat-conductive sections of the liquified gas and liquor supply conduits which are disposed within the bottom portion of the receiver tank so that they are immersed in the collecting oxygenated liquor, which then serves as the heat-conducting medium between them. Oxygen absorption capability of the liquor is further increased by the above-atmospheric pressure maintained within the receiver tank. The oxygenated liquor collects as it flows from a vertical baffle plate located in the upper section of the receiver tank and against which sprays of the incoming raw liquor are directed. Preferably, the oxygenating gas is oxygen. Reintroduction of the oxygenated liquor is via a conduit extending along the bottom of the aeration tank and having laterally directed openings for emitting the liquor. Slow, uniform and continuous mixing of the liquors within the aeration tank and independently of the oxygen-transferring operation is effected by non-turbulent mixing apparatus, preferably a vertically reciprocating paddle-type flocculation apparatus having an additionally longitudinally extending and transversely oscillating paddle for imparting horizontally directed mixing in addition to the vertical mixing imparted by the up and down movement of the conventional vertically moving paddles. Alternative mixing apparatus is also described. Continuous non-turbulent extraction from the aeration tank of the liquor portion to be treated in the receiver tank is by a high capacity, low head pump.

31 Claims, 5 Drawing Figures

METHOD AND APPARATUS FOR OXYGENATING AEROBICALLY DECOMPOSABLE LIQUORS

This application is a continuation-in-part of my co-pending applications Ser. No. 476,856, filed Jun. 6, 1974, and Ser. No. 530,037, filed Dec. 5, 1974 both abandoned.

BACKGROUND OF THE INVENTION

This invention relates to techniques for oxygenating aerobically decomposable effluent liquors such as raw sewage, treated and untreated wastewater effluents, and other raw and mixed liquors such as those from municipal sewage systems, food processing plants, and industrial plants of various types such as pulp and paper mills, steel mills, and the like. Oxygenation of such raw and mixed aerobically decomposable liquors is for the purpose of biologically oxidizing the impurities in the liquor, as is well known.

Although the invention will be found useful in the treatment of other effluent liquors such as wastewaters produced in pulp and paper mills, food processing plants, and elsewhere as previously indicated, it was made in connection with an attempt to improve well-known activated sludge techniques for treating sewage and will therefore be described in connection with such use.

The purification of sewage and wastewaters by the biological oxidation of their contained impurities has long been known and is most commonly conducted using the activated sludge treatment process. Although variations of the process are known, in general it involves flowing into an aeration tank either the raw sewage or preferably the primary effluent from a primary clarifier together with return activated sludge from a final clarifier, and the introduction of air or oxygen into the mixed liquor to promote the growth of certain aerobic microorganisms which subsequently consume the organic impurities contained in the liquor so as to convert them into harmless, oxidized by-products such as carbon dioxide, ash, water, etc., as is well understood by those skilled in the art. The mixture of liquid and biological floc produced in the aeration tank is separated by settling in a final clarifier into which the mixture flows after aeration, and it is a portion of the settled out biological floc or activated sludge from the final clarifier which is reintroduced to the aeration tank to inoculate the incoming raw sewage upon its introduction into the aeration tank, and which is thus used to speed the growth of the organisms and, of course, the treatment process. The liquid drawn from the final clarifier is substantially pure and may be chlorinated and discharged into a river or reused in an industrial process, with or without its being further processed. This invention is concerned with the aeration stage of such a process.

For an activated sludge treatment process to be successfully conducted, it is necessary that certain environmental conditions of the aerobic organisms be maintained during the aeration stage, among which is a sufficient supply of dissolved oxygen as is necessary to stimulate their growth or multiplication. In addition, it is necessary that the untreated sewage and activated sludge contained in the aeration tank be constantly mixed in a proper manner so that solids which are suspended in the mixed liquor (MLSS) will be retained in suspension during the process and thus more completely exposed to the impure liquor being treated. In this regard, it is known that optimum velocities throughout the aeration tank, including areas adjacent to the tank bottom, should be on the order of from 1.0 to 3.0 feet per second to produce the most desirable degree of mixing. Lower velocities will permit settling of the suspended solids with consequent reduction in their oxidation rate, and higher velocities are not only wasteful of the energy required to produce them but may cause shearing or homogenization with the wastewater of the relatively fragile biologically active floc which is being produced during the aeration process, thus impeding separation of liquid phase products from solid phase products in the final clarifier apparatus to which the mixture is passed following the aeration treatment.

Previous attempts to improve the speed or the efficiency of the aeration process have either intentionally or inherently involved an interdependent relationship between the aeration or oxygenating aspect of the process and the mixing aspect of the process, such that any attempt to improve or control one of these aspects necessarily affects the other. For example, although the mixing rate may be adequate to keep solids in suspension yet avoid homogenization of the floc, aeration tanks fitted with surface aerators may at times require additional amounts of dissolved oxygen in order to adequately respond to imposed variations in operating conditions, such as a sudden increase in, or a change in the nature of the sewage being treated. The only means for providing such additional oxygen is by increasing the rotational speed of the aerator, but such unavoidably causes an unneccessary and possibly detrimental increase in mixing velocity and therefore tank turbulence. Similarly, attempts to increase aeration rates in turbine aeration and diffused air aeration processes also require or result in an increase in mixing velocity. Thus, in previously known aeration methods, the maximum oxygen input has been limited to that which is accompanied by an acceptable increase in mixing velocity to just below that at which homogenization of the sludge floc will occur.

Apart from the considerations imposed by attendant increase in mixing velocity, previous attempts to increase the amount or rate of absorption of oxygen in the liquor being aerated have not been entirely satisfactory. For example, diffused air aeration techniques involve the introduction of large quantities of compressed air into the mixed liquor via various types of diffusers in a manner not unlike that of an airlift pump. However, these techniques require relatively high power and, because oxygen transfer occurs via the liquid interface of a small rising bubble whose time duration within the liquor is relatively short as it travels to the surface, the oxygen transfer efficiency is comparatively low. Similarly, turbine aeration techniques involve the introduction of such air bubbles beneath a horizontally disposed and rotating circular plate having attached blades for the purpose of shearing the air bubbles to reduced size and dispersing them within the liquor, the turbine blades being at a submerged location near the bottom of the tank where the compressed air is released to provide the air bubbles. Although oxygen transfer efficiency is improved, it is known that turbine aeration involves many of the disadvantages of simple diffused air aeration methods and is therefore not entirely satisfactory.

Other known methods of improving oxygen absorption include the direct introduction of gaseous oxygen, instead of air, to the sewage being treated, the manner of introduction being essentially the same as that involved in diffused air aeration, turbine aeration, and surface aeration processes in both open and covered tanks. However, it is found that much of the introduced oxygen is lost to the surrounding atmosphere, or must be released undissolved from the pressurized environment within which aeration takes place, such that the operating costs of such gaseous oxygen treatment techniques are relatively high.

Of course, any increase in either the amount or rate of dissolving of oxygen within the sewage permits a concommitant increase in the concentration of mixed liquor suspended solids and consequent decrease in the required time of treatment. Such reduction in aeration tank detention time permits reduction of the size of the aeration tank, or enlarged capacity of the system, and other attendant benefits.

As described, for example in U.S. Pat. No. 3,547,815 (McWhirter), it is known that the amount of oxygen ultimately absorbed by the treated liquor (i.e., oxygen utilization) can be improved by reutilizing the pure oxygen or oxygen-containing gas delivered to the first of a series-arranged plurality of oxygenation stages, in each of the succeeding stages. The stages are provided by a number of oxygenation chambers arranged within a common aeration tank, and dissolving of oxygen is promoted within each chamber using any known surface aeration, turbine aeration, or radial brush mixing technique. However, although as high as 90% oxygen utilization is claimed for the system, its power requirements appear to be relatively high, and whichever aeration technique is used will necessarily affect velocities and uniformity of mixing throughout the tank. As previously noted, such is a disadvantage of all such known aeration devices.

In addition to the difficulty of promoting a relatively high percentage of oxygen utilization by the liquor being treated, solving of the separate problem of providing adequate and uniform mixing throughout the aeration tank has been impeded by the aeration process employed. For example, and considering that minimum velocities of about 2.0 feet per second must be maintained in the far corners as well as throughout the aeration tank, the relatively poor pumping efficiency of a submerged turbine or a surface aerator requires what is believed to be excessive energy to achieve the desired velocity at all locations, and excessive velocities are more often attained in the immediate vicinity of the mixing or aerating device. Moreover, such difficulties in establishing uniform and relatively low mixing velocities throughout the aeration tank have imposed natural limitations upon the size or depth of the aeration tank, depending upon the manner in which the aerating process is conducted. That is, the length, width, maximum depth, and shape of an aeration tank has been virtually dictated not only by the aeration technique which is adopted, but also by the required uniformity of low rate mixing throughout the tank.

Improvements in the manner of mixing have resulted in permissibly larger or deeper tanks, but, as previously noted, adoption of such improved mixing techniques has been inhibited by the manner of introduction or use of process air or oxygen.

For example, an improved mixing apparatus which has thus far been used only in water treatment flocculation processes but which has been believed not to be adaptable to sewage and similar biological oxidation processes is a vertically reciprocating paddle-type flocculation unit manufactured by the Ralph B. Carter Co. of Hackensack, New Jersey. It consists of one or more tiers of horizontally disposed planks or beams which are submerged in the aeration tank and moved slowly and reciprocally in vertical direction by a rocker arm mounted above the tank and from which the beams are suspended. In a rectangular tank, the upwardly and downwardly moving horizontal planks extend to the corner areas of the tank as well as within its central regions, and therefore produce very uniform mixing at the desired velocity as determined by the accurately controlled rate of oscillation of the rocker arm.

SUMMARY OF THE INVENTION

In order to avoid the aforementioned difficulties, it is intended by the present invention to effect the transfer of oxygen into the liquor being treated in a manner such that the amount of oxygen being transferred is independent of the rate or manner of mixing of the liquor in the aeration tank, such that each of these functions in the aeration system as a whole can be conducted with the highest possible efficiency. The invention also contemplates improvements in the efficiency of each of these functions, considered separately.

That is, in a first aspect of the present invention the oxygen transfer function within the aeration tank will not be limited by any velocity limiting or floc shearing considerations, and the mixing velocity at each location within the aeration tank will be closely controlled independently of the level of oxygen demand. Thus, a much greater input of oxygen to the sewage will be achieved, and variations in oxygen demands imposed upon the system can be accommodated using lower power and without risk of permitting either settling or undesirable homogenization of the floc being produced.

In another aspect, the invention contemplates that at least a portion of the liquor within which the oxygen is intended to be dissolved will be cooled significantly so that it will absorb a greater percentage of the oxygen than it would at ambient air or room temperatures. The rate and amount of oxygen absorption will be further improved through the use of gaseous oxygen in preference to air as the oxygenating gas and by the somewhat higher than atmospheric pressure under which the oxygenating gas is dissolved in the liquor.

Since liquid oxygen is readily available as a source of gaseous oxygen which is generated by adding the latent heat of vaporization to the liquid oxygen, it is further intended that such heat of vaporization will be supplied by the desired extraction of heat from the liquor which is intended to be cooled by exchanging such heat between the two. Moreover, if further or secondary cooling of the liquor is desired beyond that which produces the gaseous phase oxygen, another liquified gas, preferably liquid nitrogen, may be utilized to cause such further cooling in the same manner. That is, a heat transfer relationship can be established between the liquor being cooled and such additional liquified gas, such that the heat required to convert the latter to its gaseous phase is drawn from the liquor to be cooled, thus effecting a secondary cooling of the liquor.

For these purposes the invention contemplates apparatus in which pipes which carry liquified gas to be gasified will be immersed in the bath of liquor to be cooled and will therefore extract heat from the latter, and/or that the separate pipes which carry liquified gas to be gasified and the liquor to be oxygenated will be immersed in a common bath through which the desired heat exchange between the pipes will occur.

In addition, and as is facilitated by the separation of the oxygenating and mixing aspects of the aeration process, in furthering the object of enhancing the amount and rate of oxygen absorption by the liquor and thus making the oxygenating function as efficient as possible, new techniques are presented for directly and continuously mixing the oxygenating gas with only a portion of the liquor being treated, and for recycling the oxygenated liquor portion to the main pool of liquor in the aeration process. Regarding the latter, the liquor portion is saturated or supersaturated with oxygen, and is in a cooled state when it is reintroduced into the aeration tank from which it was initially drawn. Aerobic oxidation in the aeration tank is thus enhanced by inoculation of the liquor within the tank with cool, oxygen-saturated liquor and, as will be noted, the oxygenating action can be conducted at either slower or faster rates to accommodate changes in the system load without affecting the desired constant rate of mixing of the raw and mixed liquor which is taking place in the aeration tank.

The further object of mixing the liquor contained in the aeration tank adequately and completely and in a very efficient manner for the purpose of maintaining solids in suspension without homogenization or breaking of the floc, is intended to be achieved using whatever mixing apparatus is considered the most suitable under the particular circumstances of use to effectuate such mixing without imparting turbulence to the mixing liquor.

Moreover, it is intended that the size, or depth, or shape of the aeration tank will no longer be restricted or dictated by the type of aeration process employed, but only by the nature of the mixing apparatus which is used.

Briefly describing the invention in its preferred embodiments, the activated sludge treatment of aerobically decomposable liquor is conducted in conjunction with an aeration tank into which the raw liquor and activated sludge flow, and from which adequately aerated or oxygenated mixed liquor, containing suspended activated solids, are drawn in a conventional manner. The aeration process of the invention is preferably conducted by continuously drawing from the aeration tank a portion of the contained liquor and passing it through a separate, enclosed receiver tank in which the liquor portion is contacted with the oxygenating fluid, preferably pure gaseous oxygen, such that the liquor becomes saturated or supersaturated with oxygen.

Saturation of the liquor within the receiver tank is achieved both by cooling the liquor prior to its introduction into the tank, and by spraying the liquor into the tank toward and against a baffle plate, mounted within the tank, so that the liquor is more completely and quickly exposed to the oxygenating gas also being introduced into the receiver tank.

In the preferred embodiment of the system, the gaseous oxygen used for oxygenating the liquor is initially contained in liquified form in a separate tank. In order to effect an exchange of heat between the liquor portion which is intended to be cooled and the liquid oxygen to be gasified before introduction of both of them into the receiver tank, the separate pipelines which carry the liquor portion and the liquid oxygen extend through a bottom section of the receiver tank in parallel adjacent relation to each other. Within the tank bottom section the piping is submerged in the oxygenated liquor being produced in the upper gas head section of the tank as the incoming sprays of liquor impinge upon and flow from the aforementioned baffle plate in the presence of oxygen, and such oxygenated liquor functions as a heat exchange medium between the piping. Alternatively or additionally, the heat exchange may be effected in a conventional heat exchange apparatus located exterior of the receiver tank.

The oxygen-saturated liquor produced in and continuously flowing from the receiver tank is reintroduced into the aeration tank via a horizontally disposed pipe conduit extending along the bottom of the aeration tank and having laterally directed apertures along its length through which the oxygenated liquor is emitted. Thus, since raw sewage or primary effluent, activated sludge, and oxygenated mixed liquor are continuously flowing into the aeration tank, the liquor portion drawn off and passed through the oxygenating receiver tank actually includes a percentage of oxygenated mixed liquor being recycled.

Since the amount of oxygen which the liquor is capable of absorbing is increased when the liquid is cooled, it is desirable that the liquor portion being directly exposed to oxygen in the receiver tank be as cold as possible, even though biological oxidation will be slowed in that liquor portion. Accordingly, in a modified form of the invention the liquor supply line at the bottom of the receiver tank, which is being primarily cooled by transmitting much of its heat to the oxygen supply line, is subjected to secondary cooling by the disposition of an additional pipe within the receiver tank bottom section through which another liquified gas, preferably liquid nitrogen, is flowing. The latent heat of vaporization required by such other liquified gas to convert it to its gaseous phase is similarly drawn from the liquor supply line via the surrounding oxygenated liquid contained in the receiver tank.

The liquor portion to be introduced into the receiver tank is pumped from a submerged location within the aeration tank using a high capacity, low head pump, such as a mixed flow type or propeller type pump. Because a pressure drop will occur across the spray nozzle by which the liquor is introduced into the receiver tank, pumping pressure must be maintained somewhat higher than the 0 to 10 pounds per square inch gauge pressure (psig) under which the receiver tank operates. Of course, the release or pumping from its storage tank of the liquid oxygen and its subsequent expansion by conversion to a gas will establish an adequate and controllable pressure head under which the gaseous phase oxygen is introduced into the receiver tank and under which it is being dissolved in the liquor portion being treated therein.

In the preferred form of the invention, uniform and low velocity mixing throughout the aeration tank is achieved using a paddle type mixer, preferably a modified form of the vertically reciprocating paddle-type flocculator. That is, the required constant and non-turbulent mixing of the liquids and solids in the aeration tank is achieved by the up and down movement, responsive to oscillation of rocker arms mounted above the tank, of several vertically spaced apart tiers of horizontally extending paddle beams. An additional horizontally extending but vertically oriented oscillating sweep paddle, also mounted on the rocker arms, effects low rate mixing in the horizontal direction, as will be seen.

However, any type mixing apparatus which is best suited for the selected type or size aeration tank and the nature of the wastewater effluent being treated can be used in view of the separation of the mixing function from the oxygenating function in accordance with the invention. For example, a propeller type mixing technique may be employed in conjunction with the aforementioned oxygenated liquid-emitting conduit at the bottom of the tank. In such alternative embodiment, the emitted liquid is directed upwardly against the underside of a conical baffle, which redirects the flow in radially outward direction to permit longer residence time and better susceptibility to mixing. The rotating, low-speed mixing blade is mounted above the baffle.

Alternative embodiments of the receiver tank include an inclined arrangement of the tank as will be described, which may afford advantages under certain conditions of operation.

DETAILED DESCRIPTION OF PREFERRED EMBODIMENTS

These and other objects, features and advantages of the invention will be more fully understood from the following detailed description of the invention, when taken with reference to the accompanying drawings in which.

Figure 1:
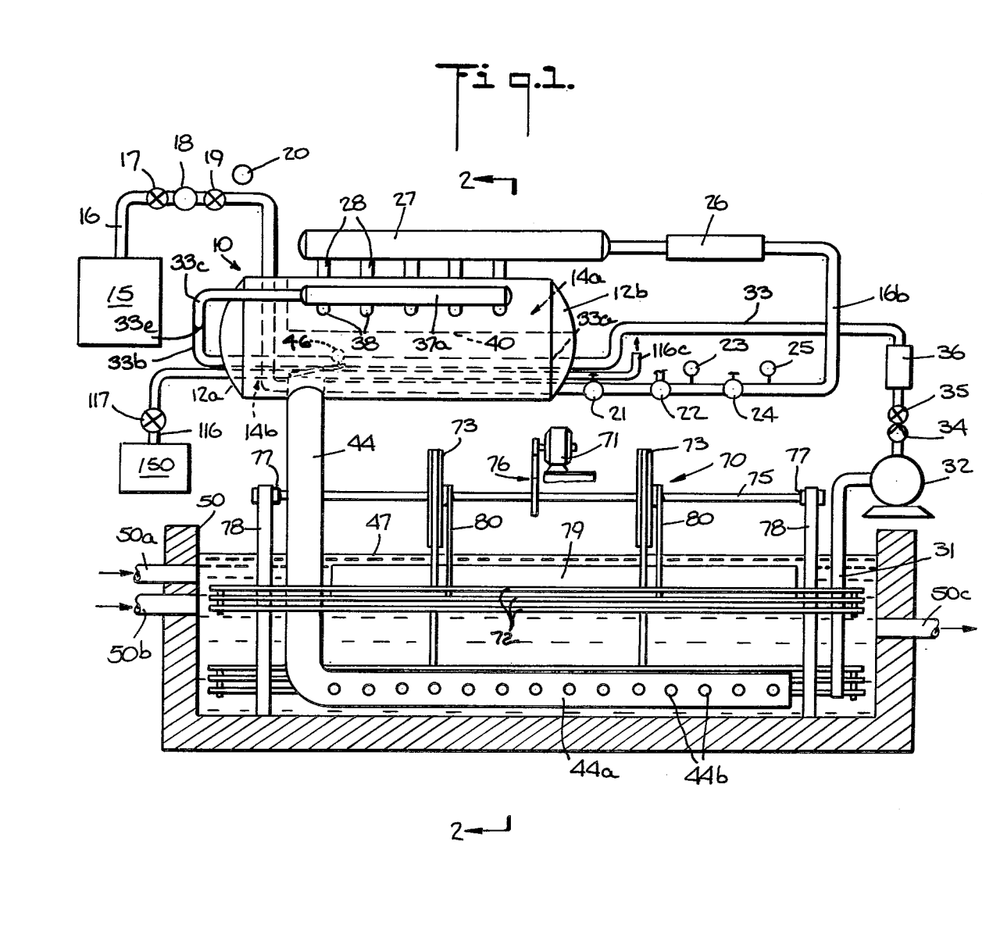
FIG. 1 is a diagrammatic elevational showing of a preferred aeration apparatus for oxygenating aerobically decomposable liquors in accordance with the invention.
Figure 2:
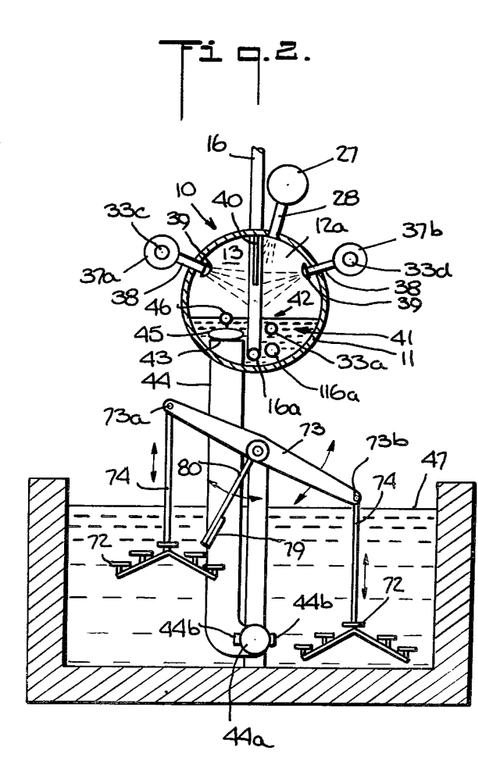
FIG. 2 is a sectional view as seen from line 2—2 in FIG. 1.

Referring first to FIGS. 1 and 2, a preferred form of aeration apparatus for oxygenating aerobically decomposable liquors in accordance with the invention includes a raw and mixed liquor pond 30 preferably within an aeration tank 50; an enclosed receiver tank 10 within which a continuously flowing liquor portion drawn from the pond 30 is saturated with oxygen; a tank 15 containing liquified oxygen or other liquified oxygen-containing gas to be used to oxygenate the liquor in the tank 10; a return conduit 44 for returning the oxygen-saturated liquor from the receiver tank to the liquor pool 30; a non-turbulent mixing apparatus 70 for constantly mixing the liquor pool 30; and a high capacity, low head pump 32 for drawing the liquor portion from the pool 30 and delivering it to the tank 10. Further, the invention includes heat exchange means as will be described.

The tank 10 is made of steel or other strong material, and has a tubular body 11 which is capped and sealed closed at both of its ends by closure domes 12a and 12b. The thus provided interior chamber of the tank is indicated by reference numeral 13, and may be considered with reference to its upper and lower half sections as providing an upper or gas head section 14a within which oxygenation of liquor takes place as will be described, and a bottom section 14b within which the oxygenated liquor is collected and temporarily stored in a pool 41 thereof as will be explained, these subdivisions of the interior chamber 13 being defined by the surface 42 of the liquid in the bottom section 14b.

The tank 15 contains liquified gas, preferably high purity liquid oxygen, to be used in the oxygenating process. The liquid oxygen flows or is pumped from the tank 15 to the receiver tank 10 via an oxygen supply conduit 16 which includes sequentially a shut-off valve 17, a variable speed pump 18, a second shut-off valve 19, and a pressure gauge 20. A heat-conductive section 16a of the oxygen supply conduit 16 is disposed within, and extends longitudinally through the bottom section 14b of the receiver tank chamber 13. A continuing section 16b of the conduit 16 extends externally of the receiver tank 10, and includes a regulator valve 21, a pressure safety valve 22, a pressure gauge 23, a pressure reducing valve 24, a second presure gauge 25, and a flow meter 26. The conduit section 16b conducts the oxygen into an elongated tubular gas-supply header 27 from which it is introduced into the upper or gas head section 14a of the tank via longitudinally spaced apart oxygen supply tubes 28 which extend respectively between the header 27 and the receiver tank 10.

Raw liquor to be treated, such as raw sewage, or primary effluent from a primary clarifier (not shown), industrial wastewater effluent or the like, is conducted into an aeration tank 50 via an inlet conduit 50a, concurrently with activated sludge returned from a final clarifier (not shown) and introduced into the pond via a conduit 50b. These effluents, together with the oxygenated liquor portion returning through the conduit 44 as will be explained, form the liquor pond 30 within the tank. The treated mixed liquor produced in the aeration tank 50 is conducted to a final clarifier (not shown) via the outlet conduit 50c where it is settled and separated in well-known manner, a portion of the activated sludge recovered in the final clarifier being returned to the aeration tank 50 via the inlet conduit 50b as previously indicated.

In accordance with the invention a portion of the liquor pond 30 is continuously drawn and delivered to the receiver tank 10 in which it will be saturated or supersaturated with oxygen. Extraction of the liquor portion from the aeration tank is via the suction tube 31 of a high capacity, low head, variable speed pump 32, the liquor being drawn from a depth location which is below the lowest anticipated pond surface level 47. Regarding the depth location at which the portion is taken, it will be noted that the mixing within the aeration tank 50 of the liquids and solids, including the floc being produced, is continuously conducted in a manner to be described, such that the mixing is substantially uniform and complete throughout the tank, and therefore solid matter does not settle to the tank bottom as might interfere with the intended process. The pumped liquor portion may therefore be taken from virtually any location, and travels to the receiver tank 10 via the conduit 33 connected to the outlet side of the pump, the conduit including a check valve 34, a shut-off valve 35, and a flow meter 36.

As illustrated in FIGS. 1 and 2, the conduit 33 passes completely through the receiver tank 10, a heat-conductive portion or section 33a of the conduit 33 being disposed within the bottom section 14b of the receiver tank chamber 13. Exterior of the end closure wall 12a, the raw liquor supply conduit includes a continuing section 33b, which at a Y-branch 33e, is divided to form branch lines 33c, 33d, leading respectively to the ends of a pair of raw liquor supply distributing headers 37a, 37b located on either side of the vertical center line plane of the tank 10, as will be understood from a comparison of FIGS. 1 and 2. Each header 37a, 37b has a longitudinally spaced apart series of stub feeder tubes 38 which extend between the header and the interior of the gas head section 14a of the tank chamber 13 for introducing the liquor into the latter along its length. As shown in FIG. 2, each of the supply tubes 38 extends through the side wall 11 of the receiver tank 10 and carries a spray head or nozzle 39 by which the liquor emerges in a spray pattern.

As further seen in FIG. 2, the liquor spray heads 39 are directed towards the vertical center line plane of the receiver tank, along which a vertically arranged and longitudinally extending elongated baffle plate 40 extends, the plate being attached to and depending from the top of the tank wall 11. Spraying of the liquor against both sides of the baffle plate 40 may be from any angle and location above the liquid level 42, such as from an angle of 40° or 50° from the vertical plane as illustrated in FIG. 2. It will be noted that the height of the plate 40 is less than that of the gas head section 14a so that its lower edge is above the liquor pool to permit a free flow of oxygen gas therebelow and thus throughout the tank upper section 14a, and also to permit a dripping and splashing of the run-off liquor in the oxygenated liquor pool 41 therebelow which will increase the rate of oxygen absorption by the liquid. The raw and mixed liquor sprayed against the baffle plate 40 will be broken up into fine droplets and will form a relatively thin cascading film on the baffle plate which will also induce rapid absorption of the environmental gas.

The oxygen gas which is introduced into the receiver tank 10 is gaseous phase oxygen produced by raising the temperature and adding the latent heat of vaporization to the cold, liquified oxygen during its travel from the pressurized liquid oxygen tank 15 through the oxygen supply conduit 16. More particularly, the phase transformation occurs within the conduit section 16a which extends within the bottom section 14a of the receiver tank chamber 13 and which is formed of heat conducting material such as a suitable metal. The required heat is drawn from the parallel and adjacent liquor supply conduit section 33a which is also made of heat conducting material, conduction of the heat between the conduit sections 33a and 16a being via the pool 41 of oxygenated liquor within which the conduit sections are immersed. It is apparent that, concurrently with the conversion of the liquified oxygen to its gaseous phase, this heat exchange effects the desired cooling of the raw or mixed liquor portion being supplied through the conduit section 33a so that its oxygen saturation point at the same pressure will be raised. In this regard, the initial temperature of raw sewage within the aeration pool is about 50° F. to 60° F., or much higher in the case of certain industrial wastewaters. Thus, unwanted heat in the liquor to be treated is advantageously employed for the necessary converting of liquified oxygen to gaseous oxygen, and the concommitant reduction in temperature of the liquor assures that it will absorb a greater amount of oxygen because it has been rendered capable of dissolving and retaining substantially more oxygen than it could at the higher ambient temperature of the initial pool 30 thereof. Moreover, the pressurized flow of oxygen into the receiver tank chamber 13 will establish and maintain a pressure within the receiver tank which is higher than atmospheric pressure, e.g., higher than 0 pisg to about 10 psig, or higher, and such higher pressure further increases the capability of the liquor to dissolve and retain oxygen. Accordingly, the oxygenated liquor collecting in pool 41 within the receiver tank 10 becomes substantially saturated or supersaturated (depending upon tank pressure) with oxygen at the temperature and pressure conditions obtaining in the tank, but is in any event supersaturated with oxygen with respect to the higher temperature and lower pressure conditions it will encounter within the pool of liquor 30 to which it will be reintroduced.

Thus, such desirable maximum absorption of oxygen in the liquor portion within the receiver tank 10 is brought about by a number of features of the invention, including the use of pure oxygen; the technique of spraying the liquor against, and the dripping of the liquor from the baffle plate 40 which produce fine droplets ready for absorption of oxygen; the forming of a cascading liquor film on the baffle plate 40 which further enlarges the surface area of the liquor for ready absorption of oxygen; the cooling of the liquor prior to its exposure to the oxygen and the somewhat elevated pressure within the receiver tank chamber, both of which increase the amount of oxygen which will be absorbed by the liquor.

The amount of oxygenated liquor collected in the receiver tank liquor pool 41, and consequently the level of its surface 42, is determined by the elevation within the tank chamber 13 of the upper end 43 of the discharge conduit 44. At its upper end 43 the discharge conduit 44 mounts a pivotably connected clapper valve plate 45 and an associated float 46 for opening the valve plate only when the pool surface 42 is above a predetermined level, as will assure continuous submergence of the oxygen supply and liquor supply conduit sections 16a and 33a, respectively, and as will avoid gas blow down from the tank chamber 13 through the discharge conduit 44 responsive to tank pressure, and consequent loss of such tank pressure as well as of oxygen gas. Of course, alternative means for retaining the liquor surface 42 at the desired level and for effecting a similar continuous seal at the discharge conduit are available. For example, if the receiver tank 10 were mounted at an elevation below that of the liquid surface 47 in the aeration tank 50, no control device such as the flapper 45 would be required because the gas pressure within the tank would not permit the liquid surface 42 to rise above the desired level.

As also shown in FIGS. 1 and 2, supplementary or secondary heat exchange for withdrawal of more residual heat from the liquor portion flowing in the liquor supply conduit section 33a, or for additionally cooling the oxygenated liquor as it collects in the receiver tank liquor pool 41, may be provided by a second liquified gas which is stored in a tank 150 and is similarly conducted through the receiver tank bottom section 14a via a heat conductive conduit section 116a. The conduit section 116a is a portion of the secondary liquified gas-carrying conduit 116, and is disposed in parallel and adjacent heat exchange relation with respect to the liquor supply conduit section 33a within the tank. It is similarly submerged in the oxygenated liquor pool 41, so that the collecting oxygenated liquor serves as the heat conducting medium between the pipe sections 116a and 33a. The conduit 116 includes a shut-off valve 117, and discharges at an end 116c thereof either to waste in the atmosphere or to a source of reuse. The second liquified gas contained in the tank 150 is an appropriate liquified gas such as liquified air or liquified carbon dioxide, but is preferably liquified nitrogen. The heat which it extracts from the liquor conduit 33a and the pool 41 within which it is immersed is that which is required to warm it and transform it into its gaseous phase. This secondary cooling of the liquor portion in the supply conduit section 33a may be necessary when reduced demand on the aeration system has limited the flow of liquid oxygen through the heat conducting conduit section 16a to less than that necessary to withdraw the desired amount of heat from the liquor, such that the heat extracting function of the liquid oxygen must be supplemented.

The oxygenated liquor from the receiver tank liquor pool 41 is returned to the aeration tank 50 via the discharge conduit 44, the amount of oxygenated liquor continuously returned being substantially equal to the liquor portion continuously drawn from the aeration tank 50 by the pump 32. The return conduit 44 includes a horizontal portion 44a extending along the bottom of the aeration tank 50 as shown in FIGS. 1 and 2, and the oxygen-saturated liquor portion is continuously emitted from the conduit section 44a via a plurality of laterally directed discharge apertures 44b which are spaced apart along the length and on either side of the return conduit section 44a, as shown. The oxygen-saturated and cooled liquor thus introduced into the aeration tank 50 has a cooling effect upon all of the liquor in the pond 30 counteracting the exothermic biological reaction taking place therein, with a concomitant increase in the oxygen-absorption capability of all of the effluents in the pond, which further enhances the biological oxidation process and which, as previously indicated, is being speeded by innoculation with oxygen-saturated or supersaturated liquor.

Further with regard to the biological oxidation process taking place in the aeration tank 50, it will be noted that the surface of the liquor pond 30 is exposed to the atmosphere as is conventional in sewage treatment or other effluent liquor aeration tanks, and that the pond is undergoing continuous mixing using a suitable mixing apparatus, such as the apparatus 70. The mixing velocity as is produced in the pond 30 by the apparatus 70 may be controlled, as by a variable speed motor 71, independently of the rate or amount of oxygenating of the aerated liquor as is taking place either in the receiver tank 10 or within the aeration tank 50. That is, using the flow meter 26, the rate of oxygen being utilized in the receiver tank 10 and hence by the liquor in the pool 30 can be determined, whereupon such can be varied by varying the speed of the oxygen line pump 18. Moreover, the oxygen pressure and therefore the pressure in the receiver tank 10 can be varied by adjustment of the pressure regulating valve 24. Progress of the oxygenating process is thus maintained or varied, for a given rate of sewage flow, independently of the speed of the mixing apparatus 70 in the aeration tank 50, and vice versa. Similarly, the amount of liquid portion taken from the aeration tank 50 over a given period of time can be increased or decreased by varying the speed of the liquor portion supply pump 32, the flow being monitored at the flow meter 36. Thus, the rate of processing of the liquor entering the system can be speeded or retarded without regard to the rate or velocity of mixing of the liquor pond 30.

Further with reference to FIGS. 1 and 2, the preferred variable speed mixing apparatus mounted in the aeration tank 50 is of a vertically reciprocating paddle-type which, in general provides a plurality of horizontally disposed elongated planks or mixing paddles 72 extending substantially the length of the rectangular tank 50, and evenly spaced throughout the area of the tank, the paddles being moved reciprocally in the up and down directions by an oscillating rocker arm 73 from which the paddles are suspended by vertical suspension rods 74. As seen in FIG. 2, horizontal mixing paddles 72 are suspended from each of the ends 73a, 73b of the rocker arms 73 and, although not illustrated, it will be understood that several tiers of mixing paddles 72 may be mounted in vertically spaced apart relation on the suspension rods 74. The rocker arms 73 are oscillated reciprocally and at slow speed on a common shaft 75 to which they are attached, the shaft being appropriately and partially rotated alternately in opposite directions by the motor 71 via a suitable oscillating drive attachment generally indicated by reference numeral 76 in FIG. 1. The oscillating shaft 75 is mounted by end-bearings 77 on fixed support 78, as generally indicated in the drawings.

The vertically reciprocal paddle-type mixing apparatus thus far described is of a conventional type commonly used in water treatment, but not aeration processes. However, by the present invention its mixing action is improved by the addition of one or more oscillating mixing paddles 79, each being a generally vertically arranged elongated paddle extending substantially the length of the aeration tank 50 and attached to the rocker arms 73 by suspension rods 80. As are the vertically movable paddles 72, the oscillating paddle 79 is immersed in the liquor pond 30, and can be positioned at a greater or lesser depth therein. Oscillating with the rocker arms 73 at a right angle thereto as illustrated in FIG. 2, the oscillating mixing paddle 79 imparts horizontally directed mixing of the liquor in the pond 30 to supplement the vertically directed mixing action of the horizontal paddles 72.

Figure 3:
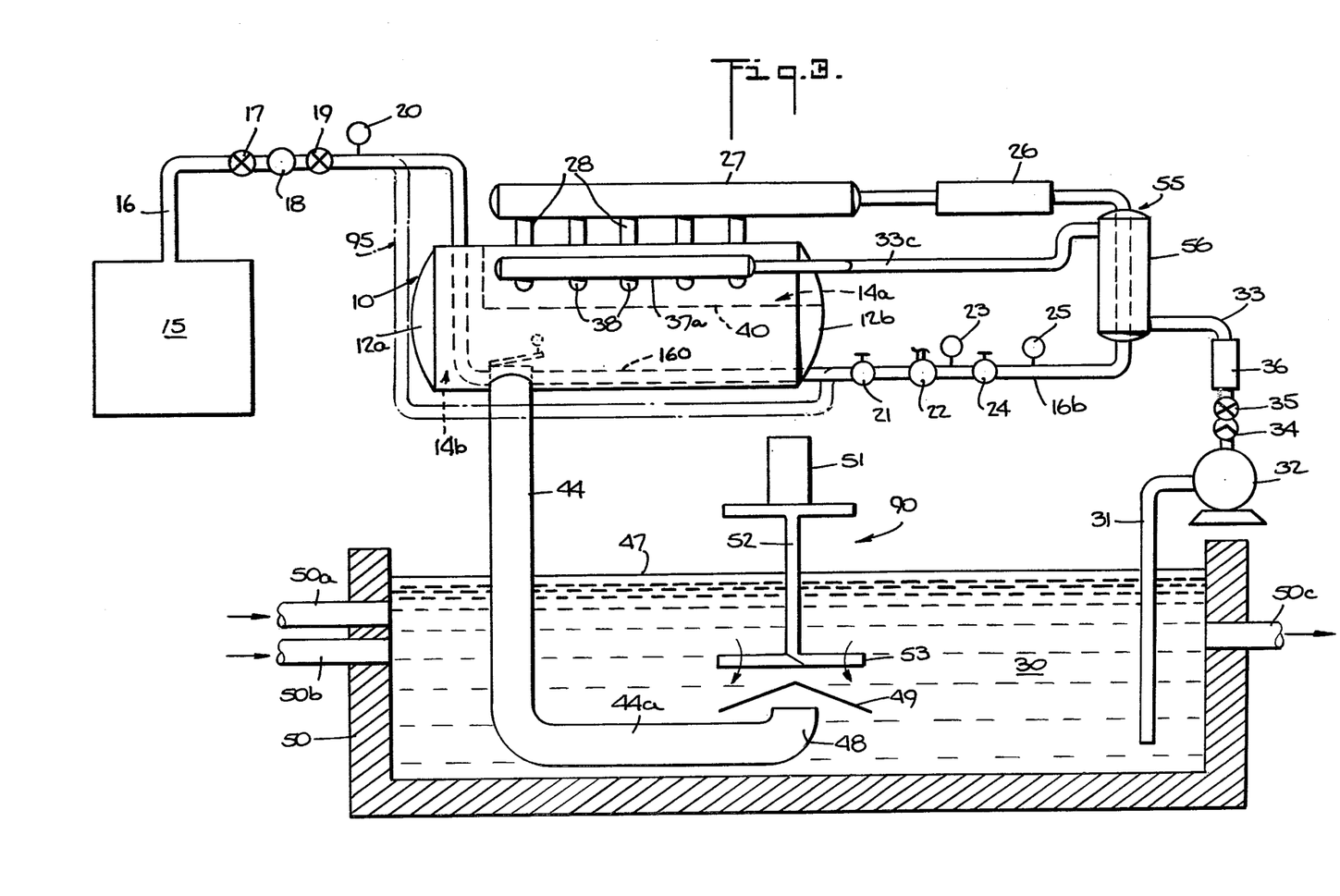
FIG. 3 is a diagrammatic elevational showing of modified forms of apparatus in accordance with the invention.

Referring now to FIG. 3, an alternative yet separately controllable mixing device 90 may be used in the aeration tank 50, if believed desirable, this alternative mixer preferably acting in conjunction with an alternative means for discharging the oxygenated liquor from the receiver tank return conduit 44 into the liquor pool 30. That is, the horizontally disposed section 44a of the oxygenated liquor return conduit 44 has an upwardly oriented open discharge end 48 near the bottom of the aeration tank 50, as shown. Preferably a conical baffle 49 is arranged in spaced relation above the conduit discharge end 48 so that, as the oxygenated liquor is emitted, it will impinge upon the concave underside surface of the baffle 49 and be directed downwardly and in radially outward direction as it admixes with the liquor pool 30. The mechanical mixer 90 is mounted above the conical baffle 49, its drive motor 51 being suitably supported above the liquor pond surface 47. A lateral bladed impeller 53 is mounted on a dependent impeller shaft 52 which is rotated by the drive motor 51. The slowly rotating impeller mixer the supersaturated oxygenated liquor, as it emerges from beneath the conical baffle 49, with the remaining liquor in the pond by imparting downwardly directed mixing action to afford maximum submerged retention time of the oxygenated liquor portion, and thus a maximum time for dispersion of the oxygenated liquor to permit gradual absorption of the oxygen by the remaining liquor in the pool without appreciable loss of oxygen to the atmosphere. Thus, virtually complete utilization of the oxygen contained in the oxygenated liquor within the aeration tank 50, is achieved.

The modified form of the invention as illustrated in FIG. 3 further provides a heat exchanger 55 for cooling the liquor portion flowing to the receiver tank 10 at a location outside of the tank, rather than within the receiver tank as provided in the preferred embodiment. That is, the liquor portion being drawn from the aeration tank liquor pool 30 via the liquor portion supply conduit 33 enters a closed chamber 56 of the heat exchanger 55, through which extends the section 15b of the oxygen supply conduit, the portion of the section 16b within the chamber 56 being of heat conducting material, such as a suitable metal, so that the flowing oxygen draws heat from the flowing liquor supply. Emerging from the heat exchanger chamber 56, the liquor portion supply flows through the conduit section 33c to the liquor supply headers on either side of the receiver tank 10, only one of the headers 37a being illustrated.

In the FIG. 3 embodiment the liquified oxygen being delivered from the source container 15 is pumped by the pump 18 through the oxygen supply conduit 16 which has a heat exchange section 160 extending through bottom section 14b of the receiver tank chamber 13 and submerged in the pool of oxygenated liquor within the tank 10, as in the embodiment of the invention shown in FIGS. 1 and 2. The oxygen supply conduit section 160 draws heat from the surrounding oxygenated liquor pool, although the rate of heat transfer is insufficient under the circumstances of receiver tank operation to convert all of the liquid oxygen to its gaseous phase. The heat exchanger 55 effects a supplemental heat exchange between the oxygen and liquor supply lines which does effect the desired complete conversion of the liquified oxygen to a gas before it is introduced into the receiver tank 10 via the oxygen header 27 and feeder tubes 28.

As indicated by the dashed line showing indicated by reference numeral 95 in FIG. 3, a further modified form of the invention provides a flow of liquid oxygen from the supply tank 15 directly to the heat exchanger 55, without any portion of the conduit extending through the receiver tank 10. Thus, all of the desired heat exchanged to cool the liquor portion supply and to gasify the liquid oxygen supply, occurs in the heat exchanger 55.

Figure 4:
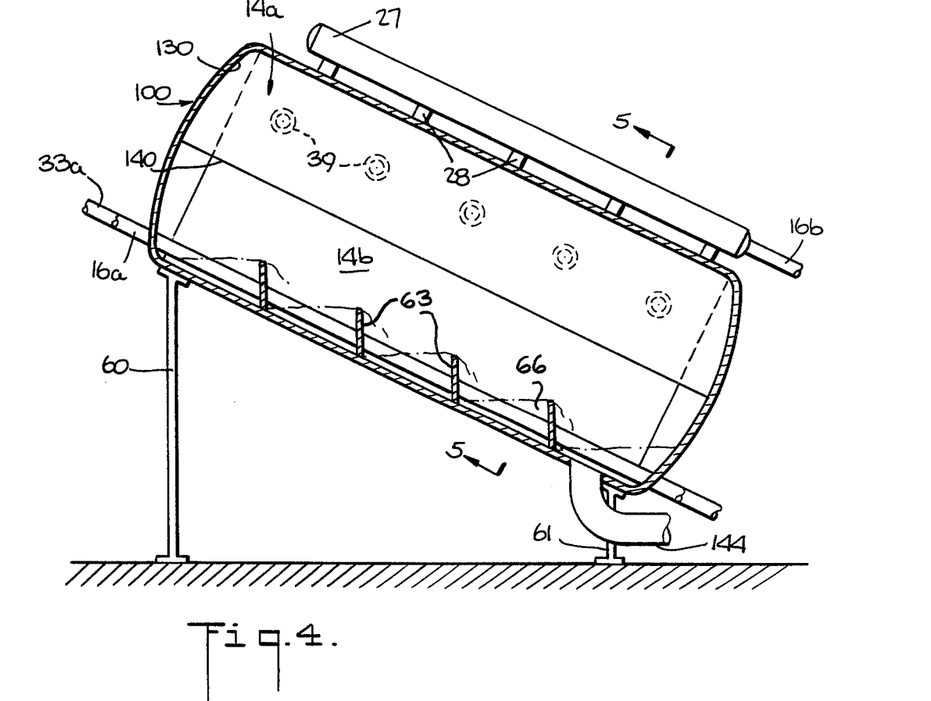
FIG. 4 is a side sectional view of a modified form of receiver tank for oxygenating aerobically decomposable liquors in accordance with the invention.
Figure 5:
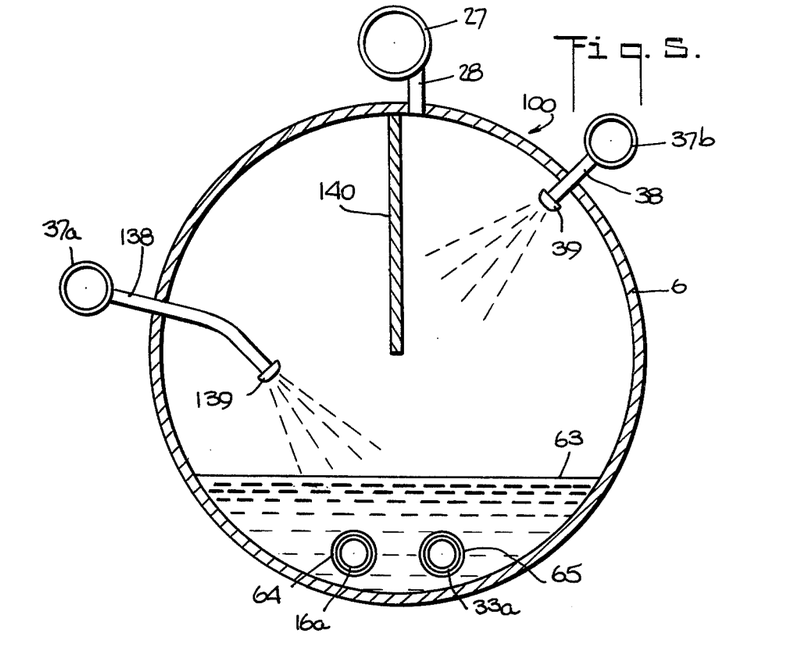
FIG. 5 is a sectional view as seen from line 5—5 in FIG. 4.

As illustrated in FIGS. 4 and 5, a modified form of receiver tank 100 in accordance with the invention provides an inclined disposition of the tank with respect to the horizontal, the tank being supported on end stanchions 60 and 61. A plurality of upright and transversely extending weir plates 63 are arranged in spaced apart relation to each other and attached along the bottom wall of the tank 100. As in the FIG. 1 embodiment of the invention, the heat conducting sections 16a and 33a of the oxygen supply conduit and liquor portion supply conduit respectively, are disposed along the bottom wall of the inclined tank 100 and pass through slightly oversized conduit apertures 64 and 65, respectively, formed in each of the weirs 63, as illustrated in FIG. 5. The slightly greater diameters of the apertures 64 and 65 as compared with the diameters of the conduit sections 16a, 33a passing therethrough permits liquid pooled behind the respective weirs 63 to weep therethrough.

The upper or gas head section 14a of the tank 100 is provided with a longitudinally extending, vertical baffle plate 140 against which a portion of the raw liquor sprayed from the nozzle 39 (FIG. 5) impinges. Another liquor portion being introduced into the tank 100 is sprayed via a similar longitudinally spaced apart series of nozzles 139 directly toward the weirs 63 and the pooled liquor therebehind. Of course, oxygen being introduced into the tank 100 via the feeder tubes 28 is free to pass under the lower edge of the baffle plate 140 which is spaced above the weirs 63 so that the sprayed liquor emerges into an oxygen environment. The liquor portions dripping from the baffle plate 140 and being sprayed from the nozzles 139 accumulate in the pockets 66 (FIG. 4) formed behind the weirs 63 and will ultimately cascade over and flow downwardly across all of the weirs 63 as illustrated in FIG. 4. Such flowing and spilling action effects an agitation of the raw liquor within the pressurized oxygen atmosphere of the receiver tank chamber, which agitation further permits the absorption of oxygen by the liquor. The thus oxygenated liquor flows from the tank 100 via the discharge conduit 144 to return to the aeration tank in the manner previously described in connection with either of FIGS. 1 or 3.

Although not illustrated, where space considerations may be paramount, it is conceivable that the oxygenating receiver tank provided by the invention may be vertically arranged, yet effectively carry out its function of saturating or supersaturating the liquor portion drawn from the aeration tank for return thereto.

With reference to any of the receiver tank embodiments, after a period of time in operation the atmosphere within the receiver tank chamber 13 may become contaminated by the release of undesirable gases, such as nitrogen and carbon dioxide, from the liquor portion as it is sprayed into the receiver tank. Thus, the gaseous atmosphere within the receiver tank chamber should be periodically withdrawn and scrubbed by passing it through a molecular sieve or similar cleaning device which separates these undesirable gases from the gaseous oxygen portion of that atmosphere, whereupon the gaseous oxygen is returned to the receiver tank chamber 13 for reuse.

Thus has been described a method and apparatus, in several embodiments, for oxygenating aerobically decomposable liquors and which achieves all of the objects of the invention.

What is claimed is:

1. A raw and treated sewage and wastewater effluent oxygenating apparatus comprising, in combination:
    (1) means defining a source of liquefied high purity oxygen constituting a cryogen;
    (2) a closed receiver tank defining an oxygenating chamber having a gas head section to which is communicated conduit means extending from said source for supplying gaseous phase oxygen to said head section, with said means including a flow conduit section of heat conducting material acting with the oxygen flowing through the latter as a heat sink;
    (3) supply means defining a substantially constant volume source of such sewage and wastewater effluent in raw or mixed liquor condition;
    (4) means to transfer such liquor under pressure from said supply means to said gas head section for oxygenating contact therein with the gaseous phase oxygen, to pool the oxygenated liquor in said receiver tank below said head section and to deliver from said receiver the oxygenated liquor; and (5) means defining a flow passage section of said transfer means through which such liquor is to flow with this flow passage section being associated in indirect heat exchange relation to said oxygen supply conduit section and liquor oxygen flowing in the latter for conversion to gaseous phase oxygen and for delivery of the latter to said receiver gas head section at elevated pressure and delivery of the liquor in cooled condition to said gas head section.

2. The apparatus as defined in claim 1 characterized by said heat exchange means including the liquor pool in said receiver tank with said oxygen supply conduit section submerged in and passing through this receiver tank liquor pool.

3. The apparatus as defined in claim 2 characterized by said transfer means including a run of pipe extending from said raw liquor source to said receiver gas head section with a length of said pipe being heat conducting and extending submerged in and through the receiver liquor pool in heat transfer relation to said submerged oxygen supply conduit section to constitute together a heat exchanger in said receiver tank.

4. The apparatus as defined in claim 3 characterized by supplemental heat exchange means comprising another heat conducting section of said oxygen supply conduit means arranged in heat transfer relation to another heat conducting length of said raw liquor supply pipe and constituting a heat exchanger exterior of said receiver tank.

5. The apparatus as defined in claim 1 characterized by said liquor transfer flow passage section and said oxygen supply conduit section being associated together in heat transfer relation outside of said receiver tank to form an exterior heat exchanger.

6. The apparatus as defined in claim 1 characterized by said closed receiver tank being elongated with its axis extending centrally through closing tank ends thereof and substantially horizontal whereby the pool of oxygenated liquor in its bottom section will be of appreciable length, means automatically determining and maintaining at least a minimum elevation of the surface of the liquor pooled in said bottom section, said liquor transfer means including a supply pipe having a length which is heat conducting and which extends through said tank bottom section substantially from end to end thereof and below said liquor pool minimum elevation, said liquefied oxygen supply conduit having its heat conducting section also extending substantially from end to end said minimum elevation and relatively closely to said liquor supply pipe section for heat transfer therebetween through the liquor pool during apparatus operation.

7. The apparatus as defined in claim 6 characterized by said oxygen supply conduit terminating at said receiver tank in an elongated header tube closed at its far end and having a plurality of branch outlet tubes located in longitudinally spaced relation along a side thereof and communicated with said receiver gas head section at longitudinally spaced points, said liquor supply pipe terminating at said receiver tank in another elongated header tube closed at its far end and having a plurality of branch supply tubes located in longitudinally spaced relation along a side thereof and which extend through a longitudinal zone of the tank sidewall defining a part of the receiver gas head section, said liquor supply tubes terminating within this gas head section in spray nozzles.

8. The apparatus as defined in claim 7 characterized by longitudinally extending baffle means mounted within said gas head section and in the paths of emitting liquor sprays from said nozzles whereby impingement thereon of such sprays break up the latter for facilitating absorption of oxygen.

9. The apparatus as defined in claim 1 characterized by said closed receiver tank being elongated with its axis extending centrally through closing tank ends thereof and at an acute angle between 0° and 90° to a horizontal plane, the interior wall of said tank nearest the ground being provided with a series of longitudinally spaced and upwardly extending weirs behind which pooling pockets are defined whereby liquor supplied to the receiver chamber in the vicinity of at least its highest end will successively pool in these pockets and spill over the weirs into the succeeding pools for oxygen absorbing agitation of the liquor, said tank having the delivery section of its transfer means communicating with its chamber in the vicinity of its lowermost pooling pocket, the heat exchanging sections of said oxygen supply conduit and of a liquor supply pipe extending successively through said pooling pockets and weirs in relatively close relationship whereby heat will be transferred from this liquor supply pipe section to said oxygen supply conduit.

10. A method of oxygenating sewage and wastewater effluent in raw or treated liquor condition within a substantially constant-volume pool thereof comprising the steps of (1) force flowing the liquor at normal environmental temperature through a supply pipe from said pool into a closed receiver tank chamber, and (2) supplying oxygen from a confined liquid oxygen source through a supply conduit into this receiver chamber with this conduit having a heat conducting section located with respect to said flowing liquor supply pipe in heat transfer relation thereto whereby the liquid oxygen is transformed by heat absorbed from the liquor to gaseous phase for delivery in this condition into the chamber for there oxygenating the liquor, and whereby said flowing liquor is cooled to increase its oxygen-absorption capability when introduced into said receiver tank chamber.

11. The method as defined in claim 10 characterized by (3) pooling the liquor in a bottom section of the chamber after oxygenating thereof in a chamber top section with the heat conducting section of the oxygen supply conduit submerged in the pooled oxygenated liquor, and (4) supplying heat to the pooled liquor from the raw liquor at normal environmental temperature by flowing the latter through a heat conducting section of the supply pipe also submerged in the pooled liquor.

12. The method as defined in claim 10 characterized by (3) delivering the oxygenated liquor from the receiver into a pond of the liquor which is capable of being oxygenated by oxygen dissolved in the former, to a point of submergence which will minimize any appreciable tendency to create surface turbulence and in a manner to create submerged currents which will transport the dissolved oxygen to various areas of the pond body for oxygenating action in the latter.

13. A method of oxygenating aerobically decomposable effluent liquor consisting of liquid and comparatively solid material, comprising the steps of extracting a portion of said liquor from a substantially constant-volume pool thereof while continuously mixing said liquor non-turbently within said pool at a rate of from about 1 foot per second to about 4 feet per second at substantially all locations throughout said pool thereby providing a substantially uniform distribution of said liquid and solid material throughout said pool and substantially preventing both breaking up of said solid material within said pool and settling of said solid material to the bottom of said pool, contacting said extracted liquor portion with an oxygen-containing fluid whereby oxygen is absorbed by said liquor, and reintroducing said oxygenated liquor into said pool from a plurality of substantially uniformly distributed locations substantially at the bottom of said pool while continuing said non-turbulent mixing of said liquor within said pool, said extracting of a portion of said liquor and said reintroducing of said oxygenated liquor portion being conducted at a rate which can be varied independently of said rate of mixing and in accordance with changes in the amount of oxygen required by said decomposable effluent liquor to cause its decomposition at an optimum rate.

14. A method according to claim 13 wherein said liquor portion is extracted substantially continuously from said pool thereof, and said steps of contacting said liquor portion with oxygen-containing fluid and reintroducing said oxygenated liquor portion into said liquor supply are conducted substantially continuously.

15. A method according to claim 13 wherein said contacting of said extracted liquor portion with oxygen-containing fluid is performed by spraying the liquor towards and against a baffle plate while contacting the liquor with said fluid.

16. A method according to claim 15 wherein said baffle plate is substantially upright, and said contacting step further comprises permitting said sprayed liquor to flow downwardly on said baffle plate while contacting said downwardly flowing liquor with said fluid.

17. A method according to claim 16 wherein said baffle plate has a lower edge which is spaced above a pond of oxygenated liquor, and said contacting step further comprises permitting said downwardly flowing liquor to drop from said baffle plate lower edge into said liquor pond while contacting said dropping liquor with said fluid.

18. A method according to claim 13 wherein said liquor portion is saturated with oxygen before it is reintroduced into said pool.

19. A method according to claim 18 wherein said contacting step is conducted under pressure whereby said liquor portion is supersaturated with oxygen before it is reintroduced into said pool.

20. A method according to claim 13 wherein, after it is extracted but before it is contacted with said oxygen-containing fluid, said liquor portion is cooled whereby its oxygen-absorbing capability is increased.

21. A method according to claim 20 wherein said cooling of said extracted liquor portion is conducted by transferring heat indirectly therefrom into a liquefied oxygen-containing gas in sufficient quantity to gasify at least a portion of said liquefied gas, and said contacting step is conducted using said gasified oxygen-containing gas.

22. A method according to claim 13 wherein said mixing comprises moving at least one submerged, horizontally disposed paddle slowly and reciprocally in a substantially vertical direction.

23. A method according to claim 22 wherein said mixing further comprises moving at least one submerged, substantially vertically oriented sweep paddle slowly and reciprocally in a substantially horizontal direction.

24. Apparatus for oxygenating aerobically decomposable effluent liquor comprising an aeration tank of substantially constant volume for containing said effluent liquor, mixing means for continuously mixing said effluent liquor within said aeration tank at a substantially uniform rate of from about 1 foot per second to about 4 feet per second substantially throughout said aeration tank, a receiver tank, means for extracting a portion of said liquor from said aeration tank and for introducing said liquor portion into said receiver tank, said mixing means being operable independently of the operation of said means for extracting a portion of said liquor from said aeration tank, means for introducing an oxygenating fluid into said receiver tank for mixing with said liquor portion therewith, said receiver tank having means for collecting said oxygenated liquor in a pool within said receiver tank, and means for extracting said oxygenated liquor portion from said receiver tank pool and reintroducing the same into, and substantially uniformly throughout said aeration tank at substantially the bottom thereof.

25. Apparatus according to claim 24 wherein said receiver tank has baffle means therein, and said means for introducing said liquor portion into said receiver tank comprises conduit means having a discharge opening into said receiver tank and disposed for directing the discharging liquor toward and against said baffle means.

26. Apparatus according to claim 25 wherein said baffle means is a substantially vertical plate, and said conduit means discharge opening has nozzle means thereon for spraying the discharging liquor toward and against said plate.

27. Apparatus according to claim 24 wherein said mixing means comprises horizontally disposed pivot shaft means mounted substantially over said aeration tank, rocker arm means mounted on said shaft means for pivotal movement in a vertical plane, means for oscillating said rocker arm means about said shaft means to impart substantially vertical reciprocal movement to the respective ends of said rocker arm means, and substantially horizontally oriented mixing paddle means depending from each of the ends of said rocker arm means for moving reciprocally and in a generally vertical direction responsive to said oscillating of the rocker arm means.

28. Apparatus according to claim 27 which further comprises substantially vertically oriented sweep mixing paddle means connected to and depending from said rocker arm means for movement therewith reciprocally and in a generally horizontal direction responsive to said oscillating of the rocker arm means.

29. Apparatus according to claim 24 wherein said means for extracting a portion of said liquor from said aeration tank comprises a high capacity, low-head pump.

30. Apparatus according to claim 24 wherein said means for extracting a portion of said liquor from said aeration tank and for introducing the same into said receiver tank includes means for cooling said liquor prior to its said introduction into said receiver tank.

31. Apparatus according to claim 30 wherein said means for extracting a portion of said liquor from said aeration tank and for introducing the same into said receiver tank comprises a liquor supply conduit, and said liquor cooling means comprises liquified gas supply means including a liquified gas supply conduit, and means for indirectly transferring heat from said liquor supply conduit to said liquified gas supply conduit.

* * * * *